United States Patent
Schlummer

(10) Patent No.: US 7,303,706 B2
(45) Date of Patent: Dec. 4, 2007

(54) DEVICE FOR PRODUCING EXPANDED PLASTIC MOULDED PARTS IN AN INJECTION MOULDING PROCESS, USING COMPRESSED PHYSICAL EXPANSION FLUIDS

(75) Inventor: Christian Schlummer, Freiburg (DE)

(73) Assignee: Peguform GmbH, Bötzingen (DE)

( * ) Notice: Subject to any disclaimer, the term of this patent is extended or adjusted under 35 U.S.C. 154(b) by 282 days.

(21) Appl. No.: 10/491,597

(22) PCT Filed: Sep. 13, 2002

(86) PCT No.: PCT/EP02/10291

§ 371 (c)(1),
(2), (4) Date: Apr. 1, 2004

(87) PCT Pub. No.: WO03/033232

PCT Pub. Date: Apr. 24, 2003

(65) Prior Publication Data

US 2005/0077641 A1    Apr. 14, 2005

(30) Foreign Application Priority Data

Oct. 15, 2001    (DE) .............................. 101 50 329

(51) Int. Cl.
*B29C 44/38*    (2006.01)
(52) U.S. Cl. ................... 264/51; 264/328.17; 425/197
(58) Field of Classification Search ................... 264/51
See application file for complete search history.

(56) References Cited

U.S. PATENT DOCUMENTS 2,595,210 A * 4/1952 Clinefelter .................. 366/87
3,792,839 A   2/1974 Gidge
4,170,446 A * 10/1979 Schutz et al. ............... 425/199
4,249,877 A *  2/1981 Machen ...................... 425/204
4,255,367 A   3/1981 König et al.
4,478,516 A * 10/1984 Kessler ....................... 366/87
5,158,986 A  10/1992 Cha et al.
6,509,049 B1 *  1/2003 Parsons et al. ............. 426/250
6,579,001 B2 *  6/2003 Krumbock et al. ........... 366/91

FOREIGN PATENT DOCUMENTS

| DE | 1 296 372     | 5/1969  |
|----|---------------|---------|
| DE | 25 04 702     | 8/1975  |
| DE | 198 53 021 A1 | 7/2000  |
| EP | 1 072375 A3   | 1/2001  |
| EP | 1072375 A2    | 1/2001  |
| JP | 05286048      | 11/1993 |
| WO | WO98/31521    | 7/1998  |

\* cited by examiner

*Primary Examiner*—Monica A Huson
(74) *Attorney, Agent, or Firm*—Henry M. Feiereisen; Ursula B. Day

(57) ABSTRACT

The manufacture of foamed polymer trim parts making use of physical blowing agents requires the diffusion and sorption of the blowing agent in the polymer melt. Said diffusion and sorption are achieved by intensive mixing. Therefore a statical mixing device is enclosed in a pressure chamber, which comprises a hollow porous cylinder, which has a surface suitable for contacting the melt with the blowing agent.

The protrusions extending at least partially into the melt flow cause a multiple reorganisation of the polymer melt, which leads to thorough mixing and shortens the diffusion path. The statical mixing device, which may be of modular construction, increases mass transport and mixing by a small modification of a conventional injection molding machine.

8 Claims, 1 Drawing Sheet

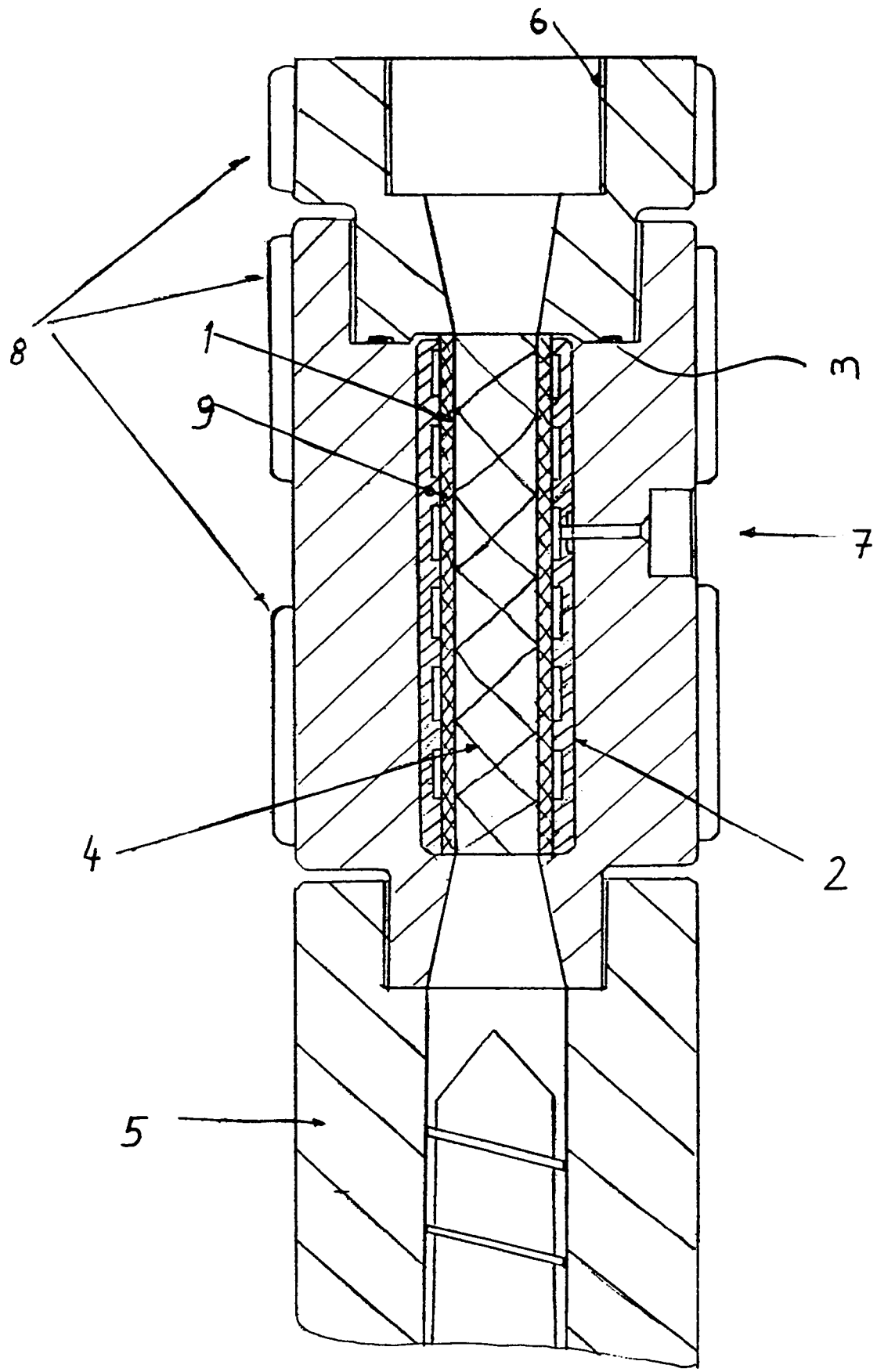

DEVICE FOR PRODUCING EXPANDED PLASTIC MOULDED PARTS IN AN INJECTION MOULDING PROCESS, USING COMPRESSED PHYSICAL EXPANSION FLUIDS

The invention concerns a device and a method for manufacturing polymeric trim parts using a physical blowing agent in an injection-moulding process making use of a conventional injection molding machine.

The compressed blowing agent is brought into contact with the polymer melt by a statical mixing device, which is mounted between plasticizing cylinder and closing nozzle. The contact element between blowing agent and polymer melt is a porous surface of sintered metal or similar material, which surrounds the mixing elements. The blowing agent is absorbed in the polymer melt through concentration and pressure differentials, which cause diffusion and sorption processes. The polymer melt and blowing agent mixture is homogenised during the injection through the protrusions extending at least partially from the mixing element into the melt channel. The diffusion processes are favoured by the reorganisation or the divisions of layers and stretching of the polymer melt. The absorption of blowing agent into the polymer melt is thereby continuously enhanced.

STATE OF THE ART

The foamed injection molding of thermoplastic materials is a special method in the area of injection molding. The main advantages of structural foam parts compared with compact parts are better material characteristics as well as economic considerations.

Structural foam parts have an increased specific stiffness value due to the fact that the geometrical moment of inertia is displaced to the surface layer. It is possible to manufacture trim parts with ribs, openings or transitions in wall thickness with a high degree of dimensional stability with less warpage, reduced internal stresses and only few sink marks. Due to the internal pressure of the polymer melt, additional pressure may not be needed, so that trim parts with a large surface area can be produced on smaller machines with low locking pressures. The density reduction leads not only to cost savings but also to reduced weight of the trim part. Increased insulation properties as well as increased stability against different media round off the properties of foamed trim parts. Structural foams are characterised by a compact skin and a core consisting of closed cells.

The generation of a thermoplastic foam makes use of blowing agents, which can be added in several ways to the polymer material. In analogy to the conventional injection molding method, the quantity of material needed for the filling of the mold, is melted in the plasticizing cylinder, dosed under pressure into the ante chamber of the screw and is injected afterwards with high speed into the mold. The pressure inhibits an anticipated expansion of the dissolved foaming agent during the dosing phase in the plasticizing cylinder. Because of the reduction of pressure during the flow of polymer melt into the tool, bubbles are generated due to the expansion of the blowing agent. A foam structure is developed. The foam density is determined by the type and quantity of the blowing agent used as well as the necessary plant technology. The basic distinction between chemical and physical blowing agents relates more to the type of dosing than to the initiation of the foaming.

Chemical blowing agents have been used predominantly in the past as their dosing is realised by simple gravimetric procedures, so that there is no need for a complex plant technology. Chemical blowing agents are added to the polymer granulate in solid state and decompose when subjected to heat and release one or more fluids, such as nitrogen, carbon dioxide or water. The drawback of said method are the decomposition products, which can amount to up to 60%. They may lead to the degradation of the polymer matrix, to the falling off of mechanical properties, to discoloration of the trim part and to corrosion and contamination of the mold. Additionally, the degree of foaming achieved by chemical blowing agents is limited due to the relatively slow gas output during decomposition.

Fluids to be dosed directly into the polymer melt are called physical blowing agents, such as inert gases as nitrogen or carbon dioxide or hydrocarbons, such as pentane as well as water. It is possible to obtain a markedly higher degree of foaming with physical blowing agents. Due to the lack of decomposition products, neither discoloring effects nor corrosions may result.

WO 9831521 A1 discloses a possibility to generate thermoplastic foams using physical blowing agents in an injection molding process. The blowing agent is injected directly into the molten polymer by means of a gas dosing station during the dosing phase by means of a plurality of inlet ports and is homogenized thereafter by means of screw mixing parts.

DE 198 53 021 A1 describes a process which foresees a special gas injection nozzle for increasing the content of blowing agent in the molten polymer. This nozzle has the shape of a torpedo and is mounted between the cylinder and the mold injection nozzle into the polymer melt flow channel and thereby divides the polymer melt flow into an annular flow. Said mold injection nozzle is formed by an annulus of porous or gas permeable sintered metal and is connected to the blowing agent supply. The charging of the polymer melt occurs at that point in time when the polymer melt is injected into the mold under high pressure.

The objective of the statical mixing device is the homogenization of multi component systems without any moving parts. The mixing energy is supplied by the fluid flow, for example, by mixing of solids in fluids or by mixing and homogenizing of multiple fluids of different viscosity. Statical mixers are used additionally to generate the maximum mass transport surface for the absorption of gases in liquids. The dimensions of the mixer have to be adapted to each material combination and each combination of process conditions.

The FIGURE illustrates the injection molding device.

DESCRIPTION OF PREFERRED EMBODIMENTS

The objective of the invention is to generate a homogeneous system of polymer and blowing agent making use of physical blowing agents, and thereby dispensing with the need of a specially adapted injection molding machine.

The statical mixing device used for this purpose is mounted between plasticizing cylinder (5) and closing nozzle (6) of the injection molding machine. The statical mixing device comprises a statical mixing element, which is fixed in a cylinder (1) made from a porous material. The porous cylinder is surrounded by a pressure chamber (2) which is charged with a physical blowing agent by connecting conduit (7). The pressure chamber is sealed in the separating area between mixer housing and connecting flange by o-ring seals (3). The cross section of the mixing element can be varied by making use of exchangeable supporting elements (9) in the pressure chamber (2).

The supply of compressed blowing agent is realised either from a pressurized bottle, a pressure vessel or a gas dosing station. If a gas dosing station is used, the supply of blowing agent may be controlled by mass flow. In the case of a pressurized bottle, the concentration of blowing agent in the polymer melt is realised dependent on the pressure by use of a pressure limiting valve. An electrically driven valve may be used for supplying the blowing agent at precise time intervals, which is controlled by the injection molding machine controlling system.

The molten polymer from a conventional injection molding machine passes the statical mixing device, the temperature of which may be regulated by electrical heating elements (8). The statical mixing device is charged with blowing agent over the surface of the porous cylinder (1). The polymer melt is charged with blowing agent by pressure and concentration differentials in the boundary layer of the polymer melt adjacent to the surface of the cylinder (1) made of porous sinter metal. The sorption concentrations in the polymer melt are then equalised by diffusion processes dependent on the material or process parameters. Protrusions (4) of the statical mixing device may extend into the channel, through which the polymer melt passes and help to mix the still inhomogeneous polymer blowing agent system during the injection phase. The continuous division and reorganisation of the polymer melt flow increases the surface area for mass transport and is susceptible for decreasing the diffusion path.

When the polymer melt flows into the mold, said polymer melt being to the pressure in a plasticized state, the resulting pressure drop causes the foaming of the polymer material as the blowing agent dissolved in the polymer melt progressively expands.

In a preferred embodiment, the mixing elements are of modular construction, whereby an adjustment to the trim part size is possible. The adaptation according to the volume of the injection molded product is realised by variable diameters and lengths of the mixing element itself. By varying the volume of said mixing element, the amount of charging of the polymer melt may be determined, which is necessary for obtaining the desired trim part in the desired weight range.

The use of a static mixing device allows a charging during the dosing phase of the polymeric material, so that there are longer diffusion times at disposition, which results in a positive influence on the obtainable sorption concentration and in a equalization of concentration differences within the charged volume.

The invention claimed is:

1. A process for manufacturing of polymeric trim parts by making use of physical blowing agents comprising the steps of, melting polymer material in a plasticizing cylinder, supplying the blowing agent to a pressure chamber of a statical mixing device, loading said pressure chamber which is circumferentially enclosing a unitary hollow cylinder having a porous cylinder wall with the blowing agent and pressing it through the porous hollow cylinder wall, whereby the polymer melt flowing past the porous hollow cylinder wall is charged with blowing agent such that the polymer melt is revolved repeatedly by protrusions extending interiorly of the hollow cylinder at least partially into the polymer melt, and transporting a mixture of blowing agent and polymer melt to a mold whereby the polymer melt undergoes a foaming process due to the expansion of the blowing agent dissolved in the polymer melt or after having entered the mold.

2. A device for the manufacture of foamed plastic trim pads by an injection molding method using a blowing agent comprising:

a statical mixing element for thoroughly mixing the blowing agent with a polymer melt from a plasticizing cylinder of an injection molding machine to form a melt mixture, the plasticizing cylinder located upstream of the statical mixing unit, the statical mixing element comprising a unitary hollow cylinder having a porous cylinder wall which is circumferentially surrounded by a pressure chamber; wherein the porous hollow cylinder wall is charged with a blowing agent over an entire surface of the porous cylinder wall via the pressure chamber for supplying the blowing agent to the melt inside the hollow cylinder, wherein interiorly of the hollow cylinder protrusions extend at least partially into the polymer melt to realize thorough circulation of the melt mixture.

3. The device according to claim 2, characterized in that the statical mixing element is mounted between the plasticizing cylinder and a nozzle of the injection molding machine.

4. The device according to claim 2, characterized in that a porous contact surface on the cylinder is a sintered metal.

5. The device according to claim 2, characterized in that the blowing agent is supplied by a conventional pressurized bottle a pressure vessel or a mass flow controlled dosing plant.

6. The device according to claim 2, characterized in that the statical mixing device is heatable.

7. The device according to claim 2, characterized in that, the supply of blowing agent is realized by an electrically driven valve.

8. The device according to claim 2, characterized in that the statical mixing element can be adapted to a variable diameter and/or length.

* * * * *